Aug. 8, 1950  J. RINNE ET AL  2,518,185
TAKE-UP MECHANISM

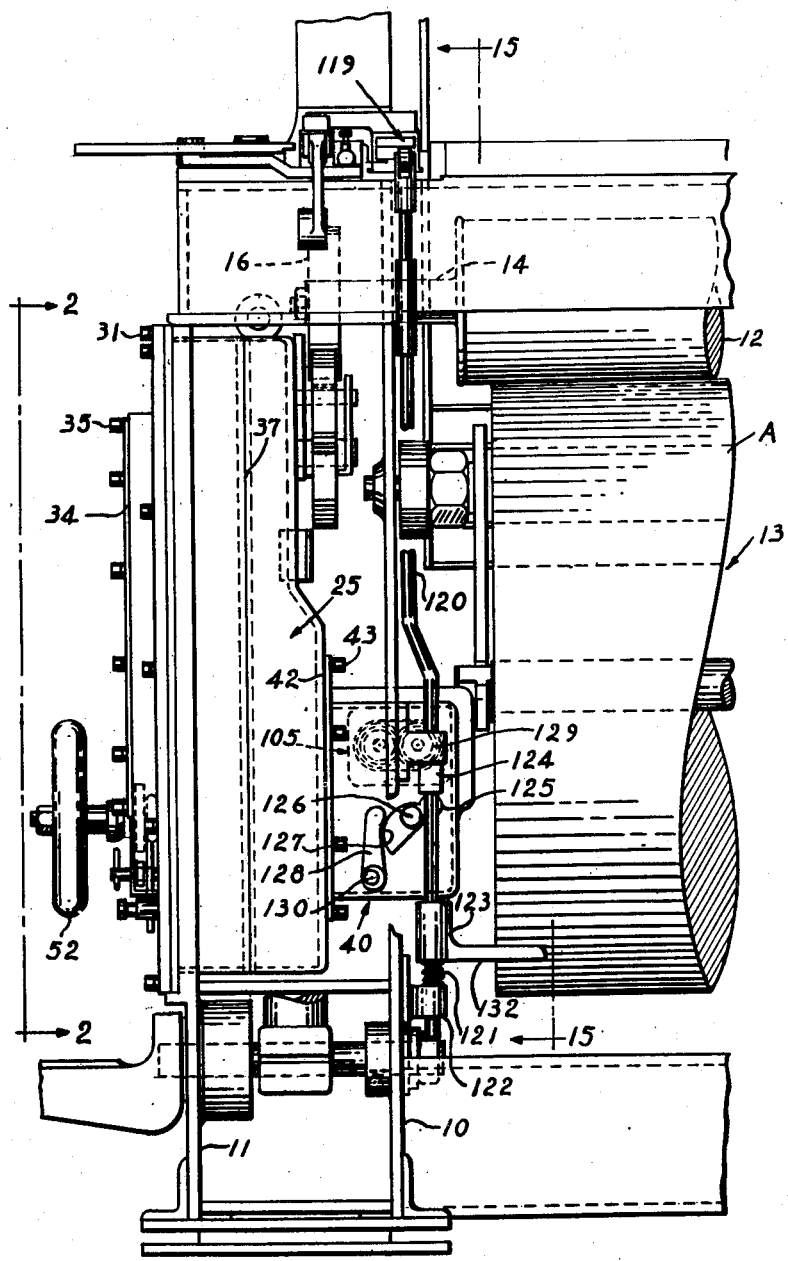

Filed April 2, 1947  8 Sheets-Sheet 2

INVENTOR.
JOHN RINNE
EVERETT H. ASHTON
ROBERT G. MALLARD
BY FRANCIS GERARD LAKE

Virgil F. Davis
ATTORNEY

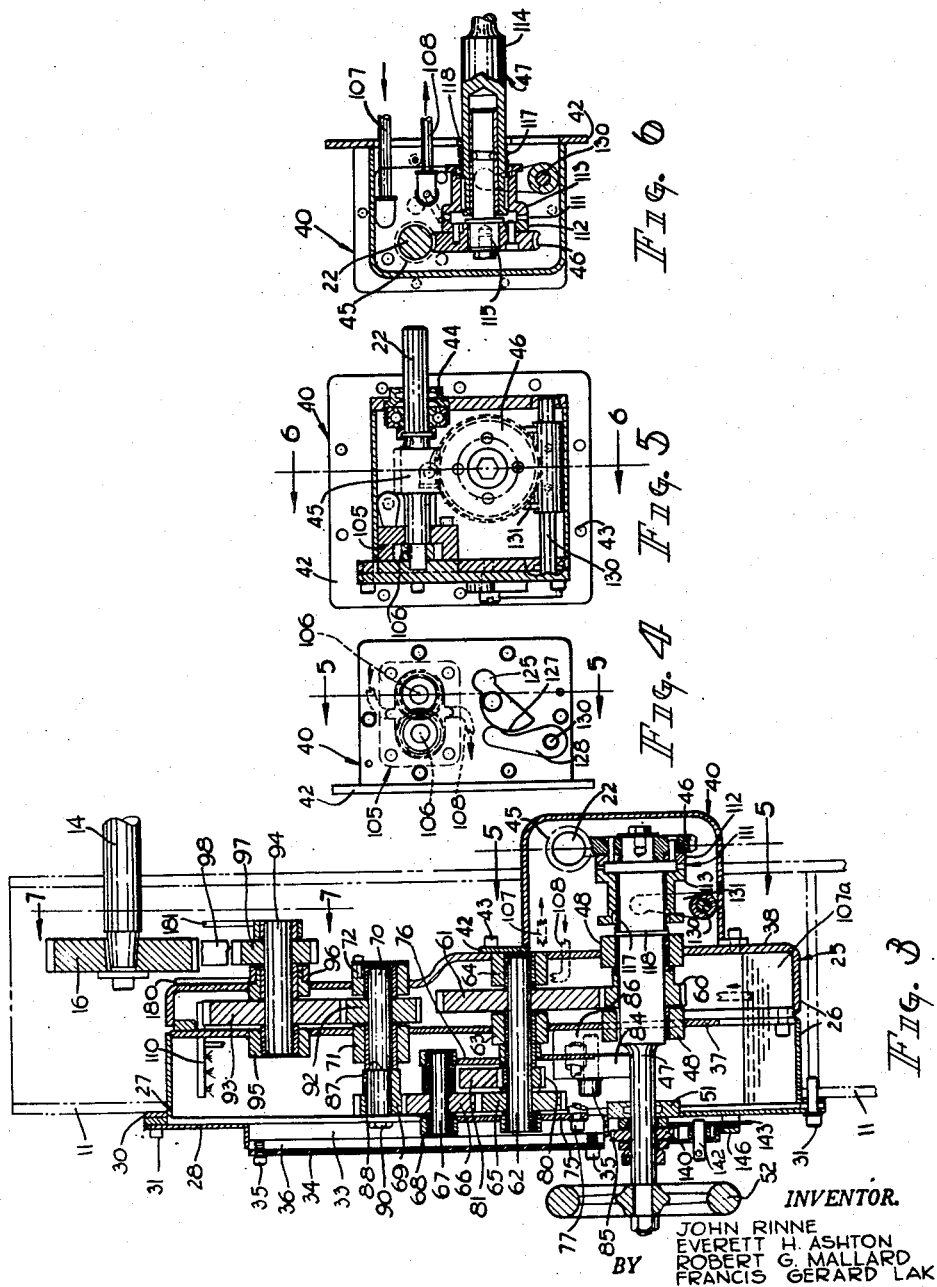

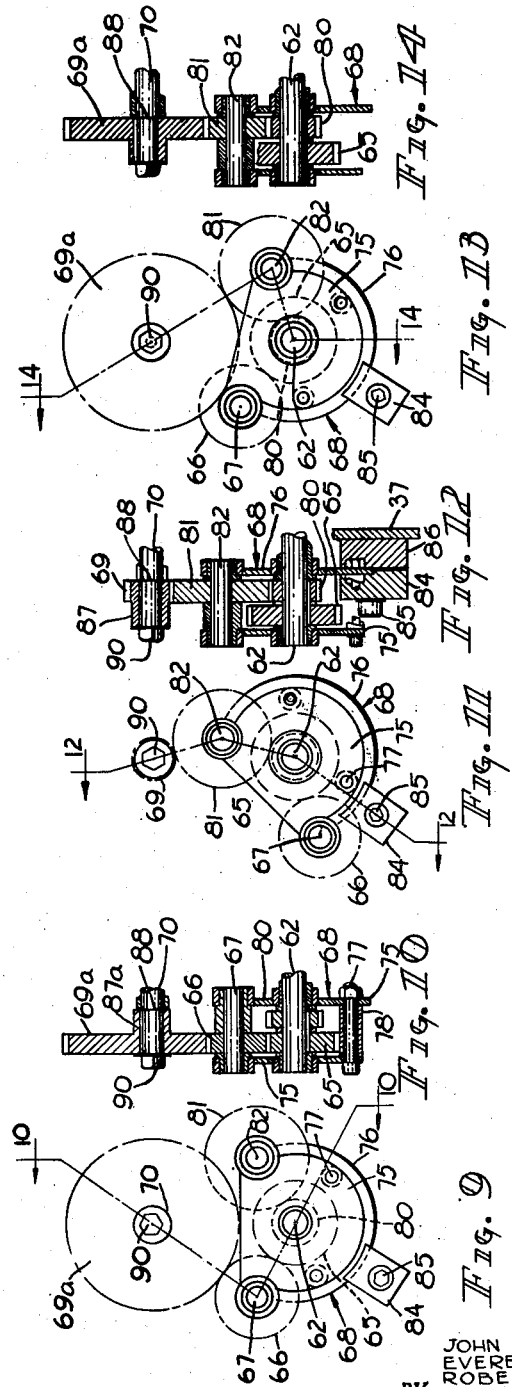

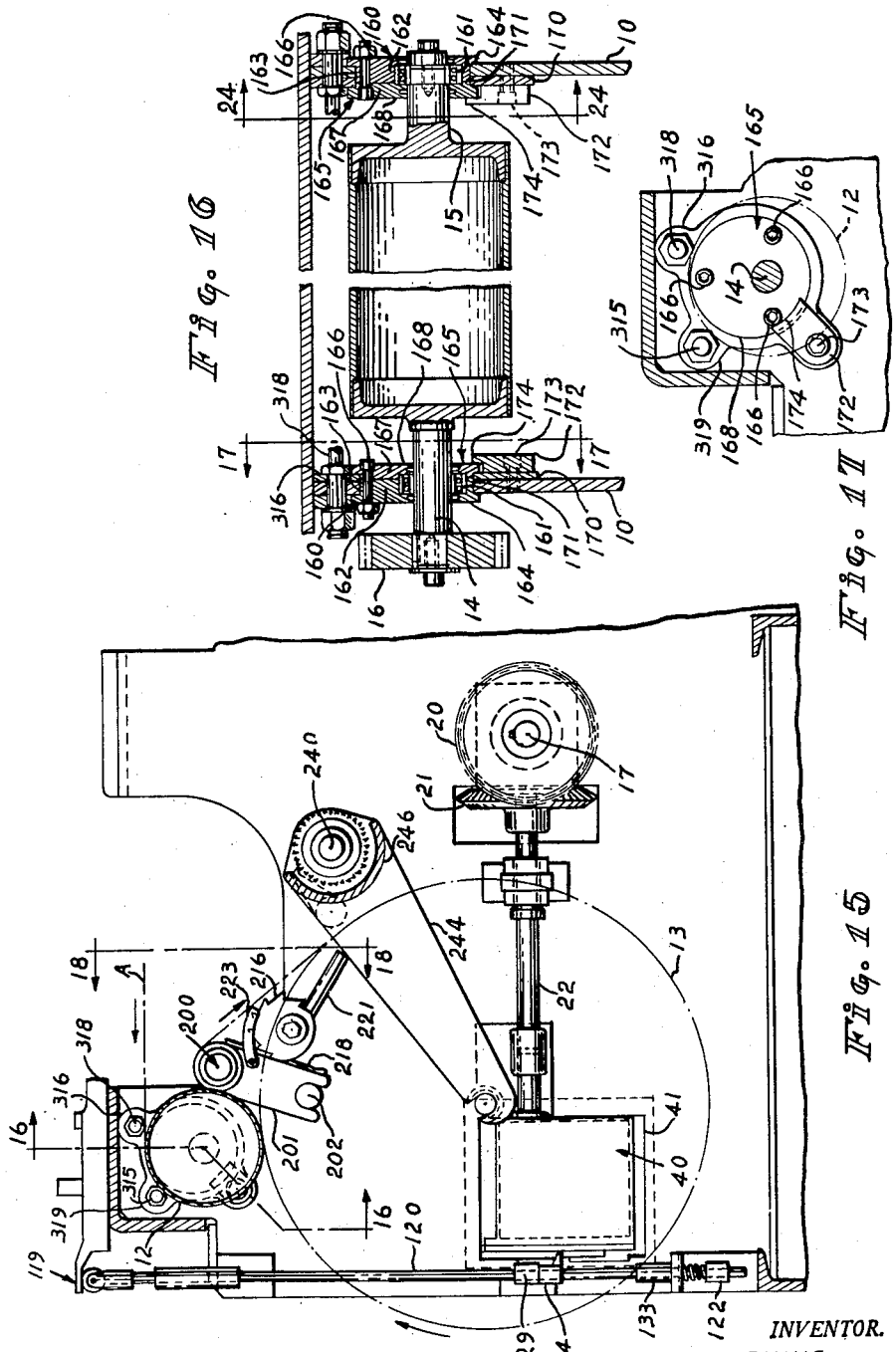

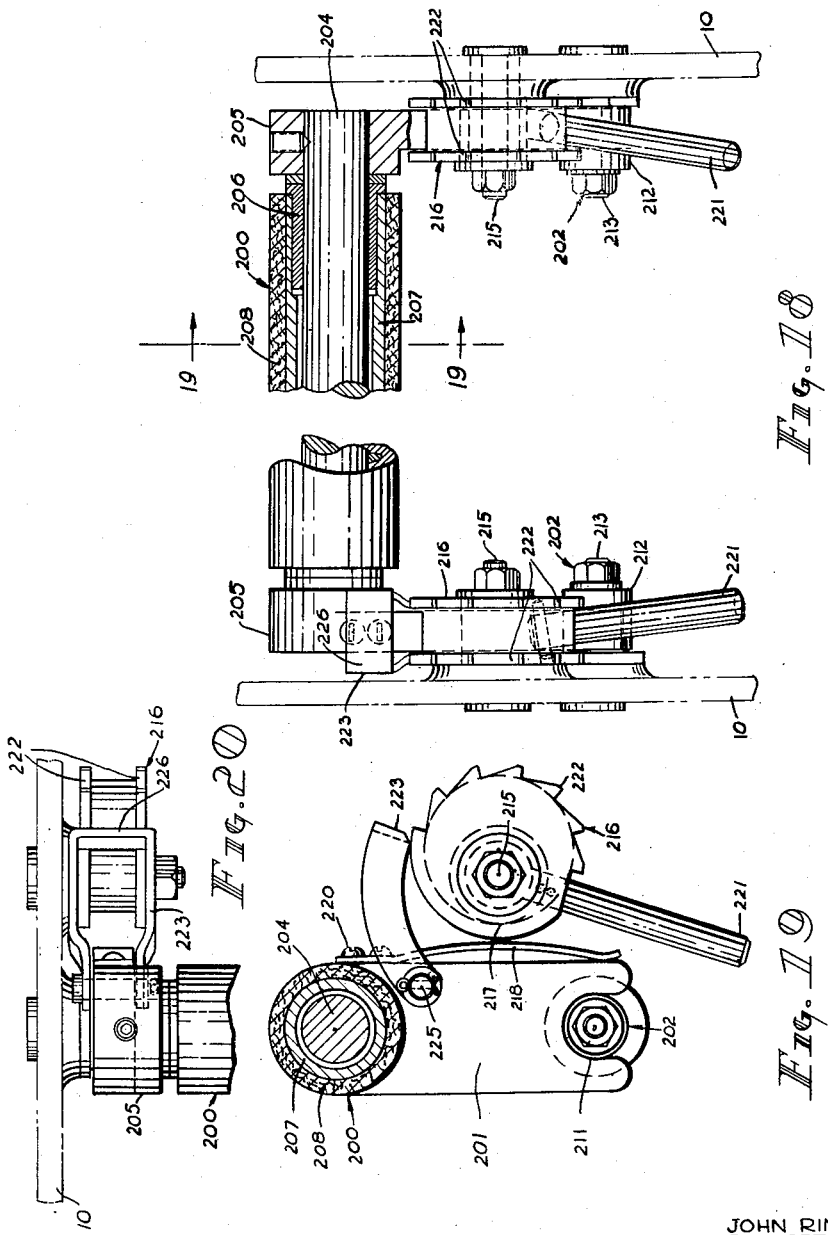

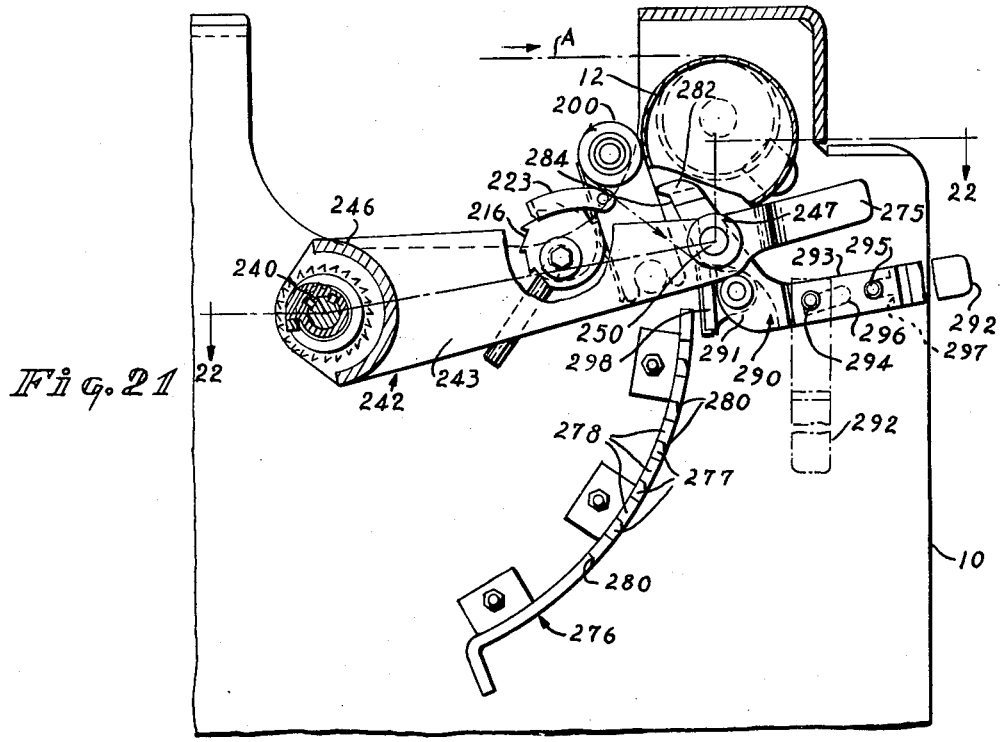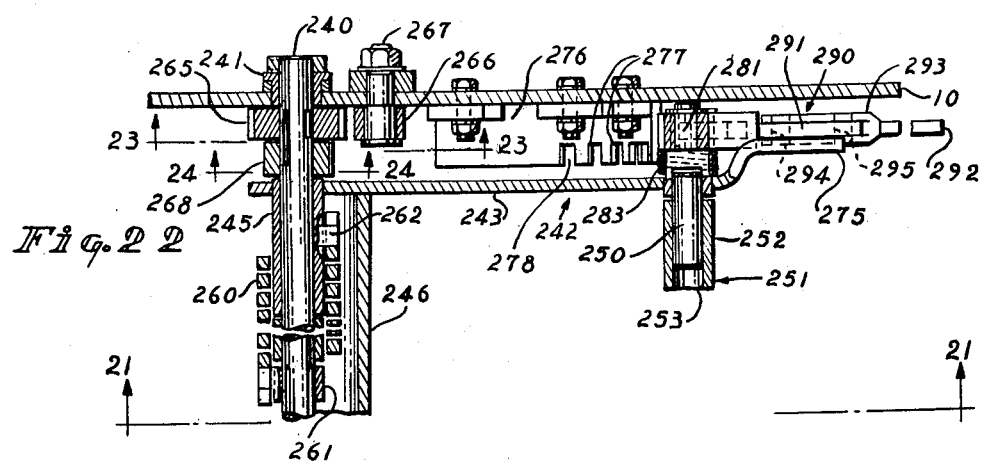

Aug. 8, 1950 J. RINNE ET AL 2,518,185
TAKE-UP MECHANISM
Filed April 2, 1947 8 Sheets-Sheet 8

INVENTOR.
JOHN RINNE
EVERETT H. ASHTON
ROBERT G. MALLARD
BY FRANCIS GERARD LAKE
Virgil F. Davico
ATTORNEY Patented Aug. 8, 1950

2,518,185

UNITED STATES PATENT OFFICE 2,518,185

TAKE-UP MECHANISM

John Rinne, Brooklyn, N. Y., Everett H. Ashton, Jersey City, N. J., and Robert G. Mallard and Francis Gerard Lake, New York, N. Y., assignors to The M. W. Kellogg Company, New York, N. Y., a corporation of Delaware Application April 2, 1947, Serial No. 739,004

11 Claims. (Cl. 139—308)

The present invention relates to a cloth roll take-up mechanism for looms.

The continuous take-up motions heretofore used on automatic looms have the main part of their gear transmissions exposed, and in position to pick up dirt, lint, threads, waste or the like. These substances, besides interferring with proper power transmission to the take-up roll, so materially increase wear on the gears that frequent replacement of these gears is required. Also, since the gear transmission is exposed, lubrication thereof is a problem, and is often attended by a messy, oily condition around the loom.

One object of the present invention is to provide a take-up motion with a gear transmission effectively protected against exposure to dirt, lint, threads, waste or the like, effectively lubricated in a tidy manner, readily accessible, as for example, for pick adjustments, arranged to permit its easy mounting as a unit on the loom frame, and having each of its shaft elements rigidly supported.

In a take-up motion, it is necessary to change the speed ratio of the gear transmission according to the desired pick.

Another object of the present invention is to provide a new and improved take-up gear transmission, constructed and arranged to permit quick, ready changes in speed ratio within comparatively wide pick ranges.

In the usual automatic type of loom, when the filling is absent by reason of breakage or exhaust of the running supply, the take-up gear transmission is automatically reversed by the tension of the cloth, to effect the desired let-back of said cloth, and thereby prevent the formation of thin streaks in said cloth.

A further object is to provide new and improved means, effectively controlled and operated to limit the extent of let-back of the take-up roll upon detection of failure of filling, and accessibly mounted for ready inspection, repair or replacements with respect to the take-up gear transmission unit.

The take-up roll is usually mounted in a manner to permit its elevation to be adjusted with respect to the warp line, in accordance with the desired cover of the cloth.

Another object of the present invention is to provide new and improved means for rigidly and firmly mounting the take-up roll in a manner which will permit the elevation of said roll to be easily, quickly and accurately adjusted with respect to the warp line.

In the usual take-up mechanism, the cloth passes around a take-up roll having a friction surface serving to engage and advance the cloth towards a cloth roll rotated by the friction driving action of the take-up roll.

Another object of the present invention is to provide new and improved easily releasable means for firmly maintaining the cloth in friction feeding contact with the take-up roll under controllable pressures, and for maintaining said cloth in pressure contact with said take-up roll even when the cloth roll is lowered out of friction driving contact with said take-up roll.

A further object is to provide a new and improved cloth roll supporting means which effects automatic lowering of the cloth roll axis as the diameter of said roll increases, while maintaining said roll in friction drive contact with the take-up roll, which permits selective adjustments in the pressure with which said cloth roll contacts said take-up roll for drive action, which permits a full cloth roll to be easily removed therefrom and an empty cloth roll to be easily mounted thereon, and which permits easy manipulation of the cloth roll up or down with respect to the take-up roll.

In the usual loom, the cloth is alternately crinkled and straightened over the take-up roll due to beat-up actions. This causes the cloth to scrape over the upper rough surface of the take-up roll, and with certain type fabrics this action injures the cloth.

Another object of the present invention is to provide a new and improved cloth protecting means which guides the cloth over the upper section of and away from the take-up roll, to avoid the abrasive action of said take-up roll section during the beat-up action, which is simple and inexpensive to manufacture, and which can be easily and expeditiously attached in operative position with respect to the take-up roll or easily demounted.

Various other objects of the invention will be apparent from the following particular description, and from an inspection of the accompanying drawings, in which—

Fig. 1 is a front view of the left-hand side of a loom embodying the features of the present invention, certain parts of said loom not related to the present invention being absent from the view for the purpose of clarity;

Fig. 2 is a side view of the loom taken approximately along the lines 2—2 of Fig. 1, and showing mainly the gear box for the take-up mechanism;

Fig. 3 is a section of the loom taken approximately along the lines 3—3 of Fig. 2;

Fig. 4 is a front view of part of the take-up gear box;

Fig. 5 is a section of the take-up mechanism taken approximately along the lines 5—5 of Fig. 4;

Fig. 6 is a section of the take-up mechanism taken along lines 6—6 of Fig. 5;

Fig. 7 is a side view of a section of the take-up gear transmission taken approximately along the lines 7—7 of Fig. 3, and shown with the take-up roll adjusted in its lower position according to the nature of cloth cover desired;

Fig. 8 is a side view of a section of the take-up gear transmission similar to that of Fig. 7, but shown with the take-up roll adjusted in its upper position;

Fig. 9 is a side view of the gear change portion of the take-up gear transmission, shown set in the upper part of its lower pick range of adjustability;

Fig. 10 is a section of the gear change portion of the take-up gear transmission taken along the lines 10—10 of Fig. 9;

Fig. 11 is a side view of the gear change portion of the take-up gear transmission shown set in the lower part of its upper pick range of adjustability;

Fig. 12 is a section of the gear change portion of the take-up gear transmission taken along the lines 12—12 of Fig. 11;

Fig. 13 is a side view of the gear change portion of the take-up gear transmission shown set in the upper part of its upper pick range of adjustability;

Fig. 14 is a section of the gear change portion of the take-up gear transmission taken along the lines 14—14 of Fig. 13;

Fig. 15 is a section of the loom taken approximately along the lines 15—15 of Fig. 1, but showing mainly the pressure take-up roll structure, the cloth roll structure and the drive input end of the take-up gear transmission near the end of cloth winding operation;

Fig. 16 is a section of the take-up roll structure taken approximately along the lines 16—16 of Fig. 15;

Fig. 17 is a detail section of the bearing structure at one end of the take-up roll taken on lines 17—17 of Fig. 16;

Fig. 18 is a section of the pressure roll structure taken approximately along the lines 18—18 of Fig. 15;

Fig. 19 is a section of the pressure take-up roll structure taken approximately along the lines 19—19 of Fig. 18;

Fig. 20 is a top plan view of the pressure take-up roll structure shown in Fig. 19;

Fig. 21 is a section of the right-hand side of the loom looking outwardly, taken approximately along the lines 21—21 of Fig. 22, and showing in the main the cloth roll structure and the support therefor at the beginning of cloth winding operation;

Fig. 22 is a section of the loom taken approximately along the lines 22—22 of Fig. 21;

Fig. 23 is a detail section of the cloth roll ratchet taken along the lines 23—23 of Fig. 22;

Fig. 24 is a detail section of the cloth roll tension spring adjustment collar taken along the lines 24—24 of Fig. 22;

Figure 26:
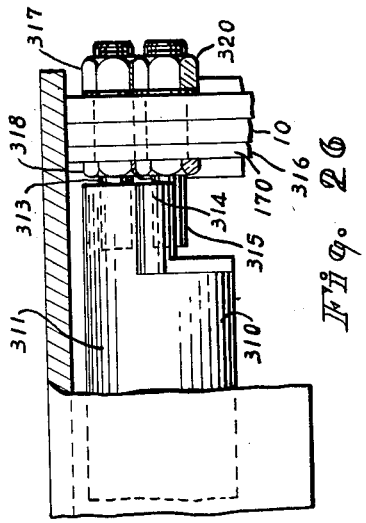
Fig. 26 is a front view of the part of the take-up roll structure shown in Fig. 24 with the chafing guard attachment.

Referring to the drawings, and especially to Fig. 1, the loom frame may be of the conventional type, but is desirably of the improved form shown in copending application, Serial No. 691,237, filed August 17, 1946. In this improved type of loom, instead of the conventional loomsides, each with a single frame web, each loomside comprises a pair of parallel webs 10 and 11 rigidly interconnected by suitable girts and bracing members.

Mounted near the front section of the loom is the take-up motion comprising a take-up roll 12 supported on the loomsides in a manner to be more fully described, and covered with sand paper or similar rough surfaced material adapted to frictionally grip the cloth A after it is formed and advance it towards the cloth roll 13. The cloth roll 13 is pressed into contact with the take-up roll 12 in the manner to be described, and is frictionally driven thereby to wind the cloth around said roll 13.

The take-up roll 12 has secured to the ends thereof gudgeons 14 and 15 (Figs. 1, 16) journalled in suitable bearings on the inside frame webs 10. One of the gudgeons 14 on the left-hand loomside has secured thereto between the two frame webs 10 and 11 (Fig. 1) a gear 16 by which the take-up roll 12 is continuously driven as the cloth is formed. The take-up roll gear 16 is driven from the crank shaft of the loom (not shown), which extends parallel to the axis of the take-up roll 12, and which drives through a pair of intermeshing gears (not shown) a short pick cam shaft 17 (Fig. 15), below said crank shaft on the left-hand side of the loom. On the pick cam shaft 17 is connected a bevel gear 20 meshing with a bevel gear 21 on a drive shaft 22. Between the drive shaft 22 and the take-up roll gear 16, is a take-up gear transmission shown particularly in Figs. 1-14.

As a feature of the present invention, the take-up gear transmission is mounted in a box or casing 25 formed with a peripheral wall 26, extending through an opening 27 in the outer frame web 11. The gear box 25 has a mounting flange 30 abutting the outer face of the frame web 11 around the web frame opening 27, and is closed at its left-hand side by a plate wall 28 secured to said flange 30 and to said frame web 11 by means of screw studs 31. The plate wall 28 is provided with a flanged opening 33 closed by a removable cover plate 34 supported in position by means of screw studs 35. The cover plate 34 is in readily accessible position and can be removed to permit access to the interior of the gear box 25, as for example, for the purpose of changing the speed ratio according to the desired pick. The cover plate 34 is desirably of transparent non-shattering material, to serve as a window, so that the interior of the gear box 25 can be easily observed.

The gear box 25 is provided with a partition wall 37 serving as a frame support for certain of the bearings of the shafts of the take-up transmission train, and has an outer wall 38 on its right-hand side, serving as a support for the bearings of some of the shafts of the gear train.

On the right-hand side of the gear box 25 is an extension 40 (Figs. 1, 3–6 and 15) passing through an opening 41 in the inner frame web 10, and having a mounting flange 42 by which said gear box extension is secured to the gear box wall 38 by means of screw studs 43. The drive shaft 22 passes through the rear wall of the gear box extension 40, is journalled in bearings 44 in said rear wall, and carries in the interior of said gear box extension a worm 45 meshing with a worm wheel 46 mounted on a take-up main drive shaft 47. The take-up main drive shaft 47 has one section journalled in bearings 48 in the box walls 37 and 38 respectively, and has a section of reduced diameter journalled in bearings 51 in the left-hand box wall 28 and passing through said latter wall to the outside of the gear box 25. The outer end of the reduced shaft section carries a hand wheel 52 for manually taking up or reversing the rotation of the take-up drive.

As a feature of the present invention, the take-up gear transmission between the take-up main drive shaft 47 and the take-up roll gear 16 is such as to permit quick and easy changes in speed ratios, in accordance with the picks per inch desired. To that end, the take-up gear transmission comprises a pinion 60 (Figs. 2 and 3) affixed to the take-up main drive shaft 47 between the two gear box plate walls 37 and 38, and meshing with a gear 61 on a first countershaft 62 journalled in spaced bearings 63 and 64 in said walls 37 and 38 respectively. Affixed to the overhanging section of the countershaft 62 is a first drive gear 65, which meshes with a first change gear idler 66 secured to an idler shaft 67 journalled in bearings in an idler gear adjusting bracket 68, and which is employed when operating in the lower pick range. The idler gear 66 meshes with a take-up driven change gear 69 on a second countershaft 70 supported in bearings 71 and 72 in the walls 37 and 38 respectively.

The bracket 68 is mounted for rotative idler gear adjusting movement about the axis of the countershaft 62, and comprises a pair of spaced plates 75 and 76 journalled on said countershaft 62, and rigidly held together by means of bolts 77 passing through respective spacer sleeves 78 between said plates. The bracket plates 75 and 76 carry respective bearings for the idler shaft 67 and respective hubs embracing the countershaft 62. Between the two bracket plates 75 and 76 is the first countershaft drive gear 65, and alongside of said gear is a second drive pinion 80 affixed to the countershaft 62. The drive pinion 80 is half the diametrical size of the first drive gear 65, and is employed when operating in the upper pick range. Meshing with the second drive pinion 80 is a second change gear idler 81 secured to a second idler shaft 82 journalled in bearings in the bracket plates 75 and 76 respectively, and adapted to mesh with the take-up driven change gear 69 on the second countershaft 70, when said change gear is in position on said second countershaft reversed from that shown in Fig. 3 for operation in the upper pick range.

The bracket 68 may be rotated in adjusting position about the first countershaft 62, to bring either of the two idler gears 66 or 81 in mesh with the selected change gear on the second countershaft 70 according to the pick range desired, and is secured in adjusted position by means of a clamp 84 secured by means of a screw stud 85 to a boss 86 on the gear box plate wall 37.

The driven gear 69 is mounted on a reduced section of the second countershaft 70, and in the lower pick range of operation, shown in Fig. 3, said pick change gear has an axial hub extension 87 abutting a shoulder 88 on said countershaft at the end of said reduced section. When the hub extension 87 extends to the right of the gear 69 as shown in Fig. 3, this pick change gear will be in mesh with the idler 66. The gear 69 is removably retained on the second countershaft 70 by means of a screw stud 90, and can be reversed into positions shown in Figs. 11 and 12 on said second countershaft when it is desired to operate in the upper pick range.

Also affixed to the second countershaft 70 is a drive gear 92 mounted between the two walls 37 and 38, and meshing with a driven gear 93 on a third countershaft 94. The countershaft 94 is supported in bearings 95 and 96 in the walls 37 and 38 respectively, and extends to the outside of the gear box 25. On the projecting part of the countershaft 94 is affixed a drive gear 97 meshing with an idler gear 98 (Figs. 2, 3, 7 and 8), which is in mesh with the take-up roll gear 16, and is secured to an idler shaft 99 journalled in a bracket 100. The bracket 100 is supported for rotatable adjustment about the third countershaft 94 to maintain the idler gear 98 in mesh with the take-up roll gear 16, irrespective of the elevation of said latter gear.

In the operation of the transmission so far described, within the lower pick range, as for example, from 18 to 64 picks per inch, the change gear 69 will be mounted with its hub extension 87 extending towards the right, as shown in Fig. 3, and against the shoulder 88 of the second countershaft 70, so that said change gear will be in mesh with the idler gear 66. The pick change gear 69 is designed to have its number of teeth equal to the number of picks per inch desired through the use of said gear, so that the operator can very easily set his transmission to afford the desired picks by merely selecting the proper change gear and mounting it as shown in Fig. 3, to mesh with the idler gear 66. As the number of picks desired increases, the diameter of the pick change gear will correspondingly change, the number of teeth on said change gear determining the number of picks. In Figs. 2 and 3, the take-up transmission is shown set with a small pick change gear 69, to afford a low number of picks in the lower pick range of 18 to 64 picks per inch. In the set-up shown in Figs. 9 and 10, a large pick change gear 69a is mounted on the second countershaft 70 with its hub extension 87a to the right and abutting the shaft shoulder 88 to afford a higher number of picks in the lower pick range of 18 to 64 picks per inch. The adjusting bracket 68 must be rotated in accordance with the diameter of the pick change gear 69, 69a, etc., to bring the idler gear 66 into mesh with said change gear, and is locked in adjusted position through the clamp 84.

To adjust the take-up transmission for operation within the upper pick range, as for example, from 36 to 128 picks per inch, all that is necessary is to reverse, on the second countershaft 70, the position of one of the pick change gears 69, 69a, etc., which was employed in connection with the setting shown in Figs. 3, 9 and 10. In this reversed position of the pick change gear, its hub extension will extend towards the left, as shown in Figs. 11, 12, 13 and 14, while its teeth section will abut the shoulder 88 on the second countershaft 70, and will be in the plane of the idler gear 81 for mesh engagement therewith. Each tooth of the pick change gear in this reverse setting corresponds to two picks, so that the operator can easily determine the size of the pick change gear required to give him the necessary picks per inch. Figs. 11 and 12 show a setting with the small pick change gear 69 reversed to obtain a low number of picks per inch within the upper pick range of 36 to 128 picks per inch. Figs. 13 and 14 show a setting with the large pick change gear 69a reversed to obtain a high number of picks per inch within this upper pick range.

Access to the change section of the take-up transmission from the left side of the loom is gained easily by merely removing the cover plate 34 after disengagement of the studs 35. A pick change can then be easily and expeditiously effected by merely selecting the right pick change gear, mounting it on the second countershaft 70 in one position or its other reversed position, according to the pick desired, and adjustably rotating the adjusting bracket 68 to bring either of the two idlers 66 or 81 into mesh with said pick change gear.

As another feature of the present invention, means are provided for positively lubricating the gear transmission in the gear box 25, and for that purpose, the drive shaft 22 carrying the take-up worm 45 drives a lubricating oil pump 105 mounted in the gear box extension 40 on the front wall thereof. The lubricating pump 105 is shown of the gear type, and comprises a pair of meshing gears 106, serving as the pumping members, and one of which is fixed to the shaft 22 so as to be driven thereby. The pump 105 has an intake 107 leading from the sump section 107a of the gear box 25, and has an outlet 108 connected to a piping system 109 distributing oil to the different rotating members of the gear transmission. The oil distribution piping system 109 may be of any suitable type, and may have a manifold 110 at its upper end provided with openings for projecting the oil downwardly from the top of the transmission. The oil from this manifold 110 will find its way through the different rotating parts of the transmission and back into the sump 107a.

With the construction so far described, the box enclosed take-up gear transmission will be protected against lint, threads, waste and other foreign substances. Also, by means of this construction, each of the gears of the transmission is keyed to a shaft supported in two or more spaced bearings, so that a rigid inflexible structure free from vibration or play is afforded. Moreover, with this encased construction, lubrication of the gears and bearings is effected efficiently without creating an untidy, oily mess around the loom. Furthermore, the transmission structure being self-contained, it can be mounted or demounted with respect to the loom frame easily and quickly as a unit.

The transparent window 34 in the gear box 25 permits observation of the inside of said gear box, so that the condition of the lubricating system in operation can be observed. It is also possible to determine through the transparent window 34 the pick setting of the loom from the position of the pick change gear 69, 69a, etc., and from the number of teeth thereon, which would be marked on the gear.

The construction of the present invention is provided with means for driving the take-up mechanism in the reverse direction to the extent required to effect the desired let-back whenever there is an absence of the filling, as a result, for example, of the breakage or exhaust of the running filling supply. To that end, or for the purpose of manually pulling the cloth ahead or back, as is necessary in the initial starting of the loom or positioning the fell of cloth, there is a clutch 111 (Figs. 3 and 6) in the take-up transmission automatically disengaged upon detection of a failure in the filling. The clutch 111 is of the ratchet tooth type, and comprises a clutch element 112 fixed to the take-up worm wheel 46, and meshing with a complemental clutch element 113 feathered on the take-up main drive shaft 47 for slidable movement therealong. The take-up main drive shaft 47 is of a sectional type, and comprises a main hollow section 114 on which the clutch member 113 is splined, and a section 115 journalled in the hollow of the main shaft section 114, and secured at one end to the worm wheel 46, as shown especially in Fig. 6.

The clutch element 113 is yieldably urged into drive engagement with the clutch element 112 by means of a coil spring 117 embracing the main shaft section 114, and bearing at one end against a shoulder or collar 118 on said shaft section, and at its other end against said clutch element 113.

The disengagement of the clutch 111 is effected automatically upon detection of a deficiency in filling by means of a filling feeler slide mechanism 119 (Figs. 1 and 15) which may be of the usual type, and which is operated when the filling breaks, or when the filling is being replenished, to move a rod 120 on the inner side of the inside frame web 10 downwardly. The rod 120 is guided for slidable movement and urged upwardly in an inoperative position by means of a spring 121 seated on one of the slide sleeve guides 122 affixed to the inner face of the inside frame web 10, and bearing against a collar 123 secured to said slide rod 120. The slide rod 120 carries a block 124 which engages on its lower side one end of a cam lever 125 pivoted at 126 to the front wall of the gear box extension 40, and which is adapted to engage on its upper side in the upper limiting position of said slide rod a sleeve rod guide 129 affixed to the inner face of the inside frame web 10. The other end of the lever 125 has a cam conformation 127 engaging a cam follower 128 secured to a rock shaft 130 journalled in the front and rear walls of the gear box extension 40, and carrying inside said extension a fork 131 engaging the clutch element 113, and serving to shift said member out of engagement with the clutch element 112 when the slide rod 120 is depressed, either upon filling transfer action, the breakage of the filling, or for manual operation.

The slide rod 120 is automatically operated from the filling slide mechanism 119, or may be manually operated by means of a foot pedal 132 integral or otherwise secured to the collar 123.

Upon the automatic or manual disengagement of the clutch 111 in the manner described, the tension of the cloth A will cause a reverse drive or let-back of the transmission beyond said clutch 111 without interfering with the rotation of the drive shaft 22 and the intermeshing gear members 45 and 46 thereby.

To control the amount of let-back, the part of the drive shaft 47 extending outwardly through the left-hand wall 28, has affixed thereto a ratchet wheel 140 (Figs. 2 and 3) cooperating with a pawl or detent 141 pivotally mounted at 142 to an arm 143 supported on said main shaft 47 for swinging movement thereabout. A spring 145 secured to the arm 143 urges the pawl 141 into engagement with the teeth of the ratchet wheel 140. The lower end of the arm 143 extends into a slot formed between a bracket 146 and the wall 28 to which said bracket is affixed. A series of holes 147 are provided in the bracket 146 for receiving a slack control stud or pin 148.

During normal running operation of the take-up transmission, the ratchet wheel 140 is rotating clockwise as shown in Fig. 2, so that this ratchet wheel rides idly past the pawl or detent 141. During this rotation, the frictional engagement of the hub of the arm 143 with the drive shaft 47 causes the rotation of said arm, until in limiting position it strikes the end of the bracket 146, as shown in Fig. 2, so that the rotative position of said arm, and in turn, the position of the pawl 141, is predetermined during normal operating conditions. Upon disengagement of the clutch 111, the tension of the cloth causes a reverse rotation of the transmission beyond said clutch, and in turn, causes the ratchet wheel 140 to rotate counterclockwise (Fig. 2). This rotation of the ratchet wheel causes the engagement of said wheel with the pawl 141, and in turn, moves said pawl and the arm 143, until said arm strikes the stud 148 disposed in one of the holes 147, according to the amount of let-back desired. When this arm 143 reaches this limiting position, further reverse rotation of the transmission is stopped.

If it is desired to manually reverse the transmission beyond the clutch 111, this can be easily effected first disengaging clutch 111, lifting pallet 150 and by manipulation of the hand wheel 52 in a counterclockwise direction. The counterclockwise rotation of the hand wheel causes the transmission to rotate in a reverse direction. The extent of let-back permitted through the hand wheel 52 may be controlled independently of the ratchet and pawl device 140 and 141 by merely moving the pawl 141 out of engagement with the ratchet wheel 140, while said hand wheel is being rotated. To facilitate this manipulation of the pawl 141, said pawl has integral or otherwise rigid thereto a handle extension 150.

As another feature of the present invention, the take-up roll 12 is mounted in bearings in the inside frame webs 10 in such a manner as to permit said roll to be vertically adjusted with respect to the warp line. This elevational adjustment is effected for the purpose well-known in the art. For example, in order to produce cover or a full appearance in the cloth, the take-up roll 12 would be raised, and if the warp is tender, it may be desirable to place said roll in a lower position, to produce less strain on the warp threads.

For roll adjusting purposes, each of the bearings for the gudgeons 14 and 15 of the take-up roll 12 comprises an eccentric bearing housing 160 (Figs. 16 and 17) defining a chamber for an anti-friction bearing unit 161. The bearing housing 160 has a cylindrical section 162 which passes through an opening 163 in the frame web 10 with a snug rotative fit, and which is provided at its outer end with a radially outward flange 164 abutting the outer face of said frame web. The inner end of the bearing housing 160 is closed by a cover 165, which is fastened to said housing by bolts 166, and which has a cylindrical section 167 similar to and abutting the cylindrical section 162 of said bearing housing 160, and a radially outward flange 168. Secured to the inner face of the frame web 10 by welding or the like is a shim plate 170 having a circular opening 171 of the same size as and in registry with the opening 163 in the frame web 10. The shim plate 170 extends around the cylindrical sections 162 and 167 of the bearing housing 160 and its cover 165, and is engaged by the flange 168 on said cover. The opening in bearing housing 160 and its cover 165, through which the gudgeon 14 or 15 extends, is eccentric with respect to the cylindrical sections 162 and 167 of said members, so that upon adjusting rotation of said cylindrical sections in the aligned openings 163 and 171 of the frame web 10 and shim plate 170, the elevation of said gudgeon will be varied.

The eccentric bearing housing members 160 and 165 are maintained in adjusted rotative position by means of a clamp 172 removably secured to the frame web 10 and to the shim plate 170 by means of a cap screw or stud 173, and having a lip 174 bearing against a peripheral section of the bearing housing cover 165 in tightened position of said clamp.

When it is desired to adjust the elevation of the take-up roll 12, the studs 173 at each end, are loosened to release clamping pressure on the bearing units 160, 165, and said units are rotated in the openings 163 and 171 to change the elevation of the gudgeons 14 or 15, and in turn, the elevation of said take-up roll 12. The two eccentric bearing units 160, 165 on opposite sides of the take-up roll 12 are adjusted to the same extent as determined, for example, by a spirit level, and when said roll has been elevated to the desired position, said bearing units are clamped in adjusted position by tightening the clamp studs 173.

As the elevation of the take-up roll 12 is adjusted, the elevational position of the take-up roll gear 16 with respect to the idler gear 98 (Figs. 2, 3, 7 and 8) is also changed. It is therefore necessary to move the idler 98 into mesh with the take-up roll gear 16 in its adjusted position. For that purpose, the idler 98 is carried on the adjustable bracket 100 supported on the third countershaft 94 of the take-up gear transmission for rotatable adjustment thereabout. The bracket 100 includes two plates 180 and 181 secured together by means of bolts 183 passing through spacer sleeves separating said plates, and is held in adjusted position by means of a clamp 184 bearing against the bracket plate 180 and fastened by a screw stud 185 to the right-hand wall 38 of the gear box 25. By loosening the stud 185, and thereby loosening the bracket 100, said bracket may be rotated to bring the idler gear 98 into mesh with the take-up roll gear 16, irrespective of the elevation thereof.

As another feature of the present invention, means are provided for maintaining the cloth A in controllable pressure friction gripping contact with the periphery of the take-up roll 12, to afford effective advancement of said cloth towards the cloth roll 13. This pressure means is shown particularly in Figs. 15, 18, 19 and 20, and comprises a pressure roll 200 extending in front of the take-up roll 12 and along substantially the full length thereof, and supported at its ends in a pair of upright arms 201 mounted at their lower ends on pivots 202 secured to the inner sides of the inside frame webs 10 respectively. The pressure roll 200 comprises an axle 204, to the ends of which are set-screwed the hubs 205 of the arms 201. Supported on the ends of the axle 204 for free rotation thereabout are bushings 206 rigidly interconnected by a cylindrical shell 207, which in conjunction with the bushings 206 is free to rotate about said axle.

Around the cylindrical shell 207 is a covering 208 of felt or similar soft friction material, adapted to engage the cloth A as it passes around the take-up roll 12, and press said cloth against said roll.

Each arm 201 is provided at its lower end with a notch 211 adapted to receive the corresponding pivot 202 with a rotative conforming fit, so that the pressure roll 200 can be adjusted angularly about its supporting pivots 202 towards and away from the periphery of the take-up roll 12. Each pivot 202 comprises a sleeve 212 supported on a bolt 213 fastened to the corresponding frame web 10.

To press the pressure roll 200 against the take-up roll 12 to a controllable extent, there is mounted on the inner side of each inside frame web 10 a cam 216 supported on an axle bolt 215 secured to said frame web. The cam 216 has a cam surface 217 on one side bearing against a bowed leaf spring 218 secured at one end by screws 220 to one edge of the corresponding arm 201. The cam surface 217 has a diameter which increases progressively in a clockwise direction (Fig. 19). Therefore, as the cam 216 is rotated counterclockwise (Fig. 19), the spring 218 is pressed to the left with progressively increasing force, and this, in turn, urges the pressure roll 200 against the take-up roll 12 with corresponding pressure. Each of the cams 216 may be rotated through a handle 221 secured thereto.

To retain the cam 216 in adjusted rotated position, each cam 216 has a series of ratchet teeth 222 on each side thereof and a pawl 223 is provided which idles over said teeth as the cam is rotated counterclockwise (Fig. 19), but which engages said teeth and holds thereby said cam against clockwise rotation tending to release the pressure of said cam against the spring 218. The pawl 223 is shown in the form of a yoke straddling at its open end the corresponding roll supporting arm 201, and pivotally secured at said end to said arm for free swinging movement by means of a pivot pin 225. The pawl 223 rests on the upper section of the cam 216, and as the cam 216 is rotated counterclockwise (Fig. 19), the teeth 222 ride idly past the crossbar 226 at the outer closed end of said pawl. Clockwise rotation of the cam 216 is prevented by the catch engagement of the pawl crossbar 226 with the ratchet teeth 222 on said cam.

The cloth A passes around approximately three-quarters of the periphery of the take-up roll 12, as shown in Figs. 15 and 21, passes over the freely rotatable pressure roll 200, and is then wound around the cloth roll 13. The pressure roll 200 thereby serves not only as a means for pressing the cloth against the friction gripping surface of the take-up roll 12, but also as a guide for the cloth in its passage towards the cloth roll 13.

The full cloth roll 13 may be lowered out of drive engagement with the take-up roll 12, and the cloth cut off, to permit said cloth roll to be removed from the loom without moving the pressure roll 200 out of contact with said take-up roll. The cloth will therefore remain threaded in position around the take-up roll 12 while a new empty cloth roll is being set up on the loom; thus the cloth roll 13 may be removed while the loom is running.

The cloth roll 13 is maintained in friction drive contact with the lower section of the take-up roll 12 to rotate said cloth roll at the speed necessary to wind the cloth therearound. For supporting the cloth roll 13 in a manner to compensate for the progressive increase in its diameter, as the cloth winding operation proceeds, there is provided a cloth roll support axle 240 (Figs. 15, 21 to 24) mounted at its ends in bearings 241 fixed to the inside frame webs 10. Supported on the axle 240 for angular movement thereabout is a cloth roll support frame 242 comprising a pair of arms 243 and 244 having respective hubs 245 embracing the axle 240 with a snug rotative fit, and rigidly interconnected by means of a cross frame piece 246. The frame piece 246 is preferably of circular segmental cross-section, and may comprise a segment of a pipe welded to the support arms 243 and 244, and extending concentrically of the roll axle 240.

The outer roll supporting end of each arm 243 and 244 is provided with a notch 247 for receiving the gudgeon 250 of a cloth roll shaft 251. The cloth roll shaft 251 includes at its ends the gudgeons 250. The cloth roll shaft 251 is thereby free to rotate in the cloth roll support arms 243 and 244, and is rotated by the friction drive engagement of the take-up roll 12 with the cloth wound around said cloth roll shaft 251.

The cloth roll support arms 243 and 244 are urged angularly upwardly about the axle 240, to maintain the cloth roll 13 in frictional contact with the take-up roll 12 under yieldable spring pressure. For that purpose, there is provided at each end of the cloth roll support axle 240 a torsion spring 260 encircling said axle, and having one end engaging a lug 261 fixed directly to the axle 240, and having its other end engaging a lug 262 fixed to the corresponding hub 245. The coil spring 260 is torsionally stressed by the two lugs 261 and 262, to urge the cloth support arms 243 and 244 in a clockwise direction, as viewed in Fig. 15.

At the beginning of the winding operation, when the cloth roll support arms 243 and 244 are in their uppermost position shown in Fig. 21, the springs 260 are torsionally stressed to their lower values. As the diameter of the cloth roll 13 increases, the cloth support arms 243 and 244 are moved angularly clockwise about the axle 240, thereby increasing the torsion stress on the springs 260. The springs 260 thereby automatically compensate for the progressive increase in the weight of the cloth roll 13, so that effective friction driving engagement of said cloth roll with the take-up roll 12 is maintained throughout the cloth winding operations.

Means are provided for adjusting the torsion stress of the springs 260. To that end, there is keyed to each end of the axle 240 a ratchet wheel 265. Pivotally mounted on the inner side of the corresponding inside frame web 10 is a pawl 266 supported on a pivot stud 267 on said frame web, and cooperating with the teeth of the ratchet wheel 265. Also keyed to each end of the axle 240 near the ratchet wheel 265 is a spring adjusting collar 268, desirably comprising two sections secured together by means of studs 270, as shown in Figs. 22 and 24. The collar 268 is of hexagonal shape to receive a suitable turning tool, and serves not only as a means by which the torsion stress on the springs 260 may be varied through rotation of the axle 240, but also as a means for spacing the cloth roll supporting frame structure 242 from the inside frame webs 10.

When it is desired to increase the torsion stress on the spring 260, the collar 268 at each end of the axle 240 is rotated in a direction to permit the corresponding ratchet wheel 265 to ride idly past its pawl 266. The detent engagement of the pawl 266 with the teeth of the ratchet wheel 265 locks the axle 240 against reverse rotation, and thereby prevents release of the adjusted torsion stress on the corresponding spring 260.

For lowering the cloth roll 13 by hand out of friction drive engagement with the take-up roll 12, as for example, when it is desired to remove a full cloth roll and to replace it by an empty one, one of the cloth roll support arms 243 has a handle extension 275. To maintain the cloth roll 13 in any selected elevational position out of engagement with the take-up roll 12 and against the action of the springs 260, there is secured to the inner face of one of the inside frame webs 10 adjacent to the cloth roll support arm 243 an arcuate ratchet bar 276 substantially concentric with the cloth roll support axle 240, and having a series of teeth 277 separated by spaces or notches 278. The outer upward edge of each tooth 277 has a bevelled surface 280 for the purpose to be made apparent. Aligned with notch 247, rigid with the cloth roll support arm 243, is a pivot stud 281. Supported on said stud for rotation thereabout is a pawl 282 adapted to ride over the outer surface of the ratchet bar 276, and urged into contact with said ratchet bar by means of a torsion spring 283. The pawl 282 has a bevelled cam surface 284 at its outer end, which is adapted to ride idly over the bevelled edges 280 of the ratchet teeth 277 as the cloth roll support arms 243 and 244 are swung downwardly about the cloth roll support axle 240, so that the downward movement of said support arms is effected without interference from the ratchet bar 276. The upward movement of the cloth roll support arms 243 and 244 is, on the other hand, prevented by the locking engagement of the pawl 282 with the ratchet teeth 277.

To release the pawl 282 from locking engagement with the ratchet bar 276, and thereby to permit the cloth roll support structure 242 to be raised upwardly, the pawl 282 has a handle extension 290 comprising a section 291 rigid with the pawl 282, and a section 292, which normally hangs downwardly from said handle section 291 as shown in dot and dash lines in Fig. 21, and which may be latched into locking engagement with said handle section 291 to form a horizontal handle extension therefor, as shown in full lines, when it is desired to render the pawl 282 inoperative. The handle section 292 has at one end a fork 293 flanking the handle section 291, and carrying a pair of pins 294 and 295 between the branches thereof. The handle section 291 has an elongated slot 296 for receiving the pin 294, and the outer end of said handle section 291 has a notch 297 for receiving the other pin 295. In normal inoperative position, the handle section 292 extends downwardly, as shown in dot and dash lines in Fig. 21, with the pin 294 resting at the bottom of the slot 296 in the handle extension 291. When it is desired to render the pawl 282 inoperative, the handle section 292 is swung counterclockise from the depending position shown in dot and dash lines in Fig. 21, until said section is in alignment with the outer end part of the handle section 291. In this position, the handle section 292 is moved inwardly to the left (Fig. 21) to bring the pin 295 into the base of the notch 297 of the handle section 291, and to bring the other pin 294 into the left-hand upper end of the elongated slot 296. In this position, the two handle sections 291 and 292 will be locked in position for clockwise rotation of the handle 290 (Fig. 21). The clockwise rotation of the handle 290 will move the pawl 282 out of the path of the ratchet bar 276. While the pawl 282 is in this released position, the cloth roll support structure 242 can be raised through the action of the torsion springs 260 without interference from the ratchet 276 and pawl 282.

To effect the upward movement of the cloth roll support structure 242 through the action of the springs 260 at controlled rates, the pawl supporting handle section 291 pivotally carries a brake shoe 298 lined with suitable braking material, and adapted to be moved into braking engagement with the ratchet bar 276, which for that purpose, serves as a brake drum. By angular manipulation of the handle 290 about the pivot stud 281, it is possible to move the brake shoe 298 towards and away from the brake drum section of the ratchet bar 276, and thereby control the ascent of the cloth roll 13 towards the take-up roll 12 under the action of the torsion springs 260.

Figure 27:
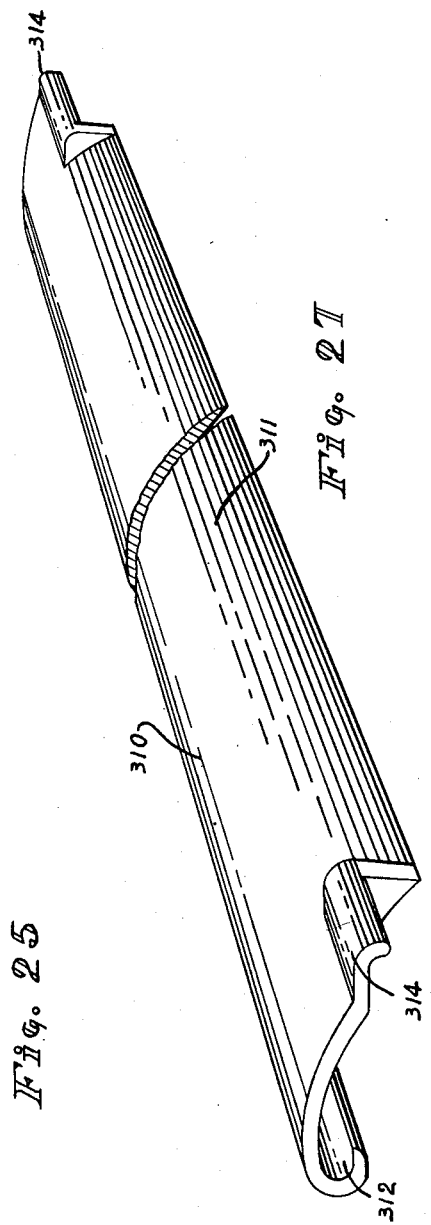
Fig. 27 is a perspective of the chafing guard attachment.

As the cloth A passes around the take-up roll 12, the beat-up action of the reed causes said cloth alternately to crinkle and straighten on the top of said take-up roll, so that the cloth is subjected to the abrasive action of the rough surface on said take-up roll. This rubbing action is detrimental to some types of cloth, and is especially prominent and undesirable in the type of full cover fine count cloth which is formed with the take-up roll 12 in its highest adjusted position. To avoid this abrasive action, there is provided a chafing guard 310 (Figs. 25, 26 and 27) presenting a smooth surface 311, and serving to guide the cloth along said surface and over the top of the take-up roll 12 towards the side of said roll where there is little or no crinkling action.

The guard 310 is in the form of a plate extending substantially the full length of the take-up roll 12 and having its rear edge section reversely curved to form a channel 312 adapted to be hooked on to studs 313 secured to the two inside frame webs 10 substantially parallel to the take-up roll 12. At its forward edge, the guard 310 is provided at each end with a catch 314 adapted to seat on studs 315 secured in a similar manner to the inside frame webs 10.

Figure 25:
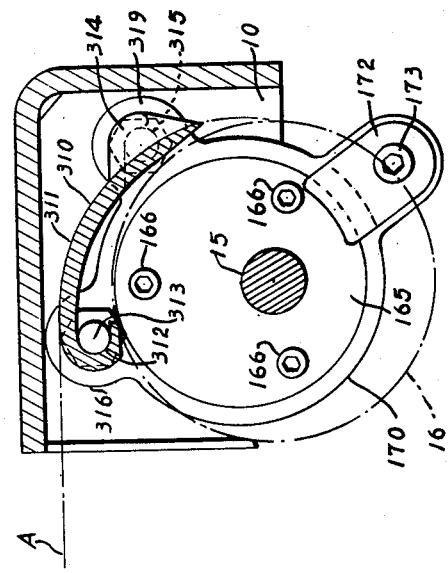
Fig. 25 shows an end view of the take-up roll structure with a chafing guard attachment to prevent abrasion of the cloth due to the beat-up movements of the cloth over the take-up roll.

The guard 310 may be expeditiously mounted in operative position shown by a simple manipulation, and may be just as easily and expeditiously removed. Since the guard 310 is mounted above the take-up roll 12, this guard determines the highest position of the cloth. In Fig. 25, the guarded take-up roll 12 is shown in its lower adjusted position, while the cloth passing over said guard is in its highest position to produce a cloth with a full appearance or cover.

As many changes can be made in the above apparatus, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. In a take-up mechanism for a loom, a take-up roll gear, a take-up main drive shaft, and a gear transmission between said shaft and said gear comprising a pair of gear trains of different speed ratios arranged in parallel in said transmission, a gear shaft, a pick change gear, and means for operatively and removably mounting said pick change gear on said gear shaft and locating it in either one or two reverse predetermined positions in drive relationship selectively with either one of said gear trains.

2. In a take-up mechanism for a loom, the combination as described in claim 1, in which said pick change gear mounting and locating means comprises a spacing member carried on one side of said pick change gear, and a stop on said gear shaft and adapted to be engaged by said spacing member in one position of said pick change gear or by the other side of said pick change gear in reversed position of said pick change gear to locate said pick change gear on said gear shaft in operative drive relationship with respect to either one of said gear trains.

3. In a take-up mechanism for a loom, the combination as described in claim 1, in which said gear shaft has an overhanging end section for receiving said pick change gear, and in which said pick change gear mounting and locating means comprises an axial hub extension on one side of said pick change gear, a fixed shoulder on said gear shaft and adapted to be engaged by the outer end of said hub extension in one position of said pick change gear or by the other side of said pick change gear in reversed position of said pick change gear to locate said pick change gear on said gear shaft in operative drive relationship with respect to either one of said gear trains, and means on the outer end of said overhanging gear shaft section for removably retaining said pick change gear on to said gear shaft section.

4. In a take-up mechanism for a loom, a take-up roll gear, a take-up main drive shaft, and a gear transmission between said shaft and said gear comprising a pair of shafts, a pair of axially spaced gears of different sizes on one of the shafts of said pair, a pair of idler gears in mesh with said spaced gears respectively, and means for removably mounting a pick change gear on the other shaft of said pair in drive relationship with either one of said idler gears.

5. In a take-up mechanism for a loom, the combination as described in claim 4, comprising a bracket for supporting said idler gears, mounted for adjusting movement about the axis of said one shaft to bring either one of said idler gears in mesh with the pick change gear on said other shaft.

6. In a take-up mechanism for a loom, the combination as described in claim 4, comprising a bracket for supporting said idler gears, mounted for adjusting movement about the axis of said one shaft to bring either one of said idler gears in mesh with the pick change gear on said other shaft, and including a pair of members flanking both of said pairs of gears and rigidly connected together, an idler shaft for said idler gears, and bearings on said members respectively for said idler shaft.

7. In a take-up mechanism for a loom, the combination as described in claim 4, comprising a bracket for supporting said idler gears, mounted for adjusting movement about the axis of said one shaft to bring either one of said idler gears in mesh with the pick change gear on said other shaft, and including a pair of members flanking both of said pairs of gears and rigidly connected together, and a releasable clamp supported on a stationary part of the loom and engaging one of said members to lock said bracket in adjusted position.

8. In a take-up mechanism for a loom, a take-up roll gear, a take-up main drive shaft, and a gear transmission between said shaft and said gear comprising a pick change gear, a shaft for said pick change gear, means for removably mounting said pick change gear in one of two axial positions on said change gear shaft, and means for driving said transmission at one of two different speed ratios in accordance with the axial position of said pick change gear on said latter shaft, to obtain different picks per inch.

9. In a take-up mechanism for a loom, the combination as described in claim 8, in which said driving means affords the number of picks per inch equal to the number of teeth on said pick change gear in one axial position of said pick change gear on its shaft, and affords the number of picks per inch equal to twice the number of teeth on said pick change gear in the other of its axial positions.

10. In a take-up mechanism for a loom, a take-up roll gear, a drive transmission to said gear comprising a drive gear, a shaft for said drive gear, an idler gear meshing with said drive gear and said take-up roll gear, means supporting said take-up roll gear for elevational adjustment, an idler gear adjusting bracket supported on said drive gear shaft for rotation thereabout to bring said idler gear into mesh with said take-up roll gear in adjusted position, and releasable means for locking said bracket in adjusted position.

11. In a take-up mechanism for a loom, the combination as described in claim 10, comprising a shaft for said idler gear, said bracket comprising a pair of members carrying respective hubs embracing said drive gear shaft and carrying respective bearings for said idler gear shaft, and said locking means comprises a clamp engaging one of said members, and screw means detachably securing said clamp to a fixed part of the loom.

JOHN RINNE.
EVERETT H. ASHTON.
ROBERT G. MALLARD.
FRANCIS GERARD LAKE.

REFERENCES CITED

The following references are of record in the file of this patent:

UNITED STATES PATENTS

| Number | Name | Date |
|---|---|---|
| 743,657 | Ott | Nov. 10, 1903 |
| 789,816 | Nutting | May 16, 1905 |
| 807,580 | Roper | Dec. 19, 1905 |
| 872,061 | Gordon, Jr. | Nov. 26, 1907 |
| 1,079,296 | Jackson | Nov. 18, 1913 |
| 1,383,478 | Northrop | July 5, 1921 |
| 1,449,835 | Pontz | Mar. 27, 1923 |
| 1,463,226 | Northrop | July 31, 1923 |
| 1,635,024 | Baker | July 5, 1927 |
| 1,790,160 | Lindsjo | Jan. 27, 1931 |
| 1,794,420 | Robellard | Mar. 3, 1931 |
| 2,013,535 | Camps | Sept. 3, 1935 |
| 2,021,432 | Santon | Nov. 19, 1935 |
| 2,390,478 | Wakefield | Dec. 4, 1945 |
| 2,425,781 | Bergstrom et al. | Aug. 19, 1947 |